United States Patent
Åkerberg et al.

(10) Patent No.: US 9,930,549 B2
(45) Date of Patent: Mar. 27, 2018

(54) METHOD FOR PROVIDING RELIABLE WIRELESS COMMUNICATION IN A WIRELESS SENSOR NETWORK

(71) Applicant: ABB RESEARCH LTD, Zürich (CH)

(72) Inventors: Johan Åkerberg, Västerås (SE); Mikael Gidlund, Sundsvall (SE)

(73) Assignee: ABB RESEARCH LTD., Zurich (CH)

( * ) Notice: Subject to any disclaimer, the term of this patent is extended or adjusted under 35 U.S.C. 154(b) by 7 days.

(21) Appl. No.: 14/650,246

(22) PCT Filed: Jan. 25, 2013

(86) PCT No.: PCT/EP2013/051407
§ 371 (c)(1),
(2) Date: Jun. 5, 2015

(87) PCT Pub. No.: WO2014/114344
PCT Pub. Date: Jul. 31, 2014

(65) Prior Publication Data
US 2015/0319630 A1    Nov. 5, 2015

(51) Int. Cl.
*H04W 24/08* (2009.01)
*H04W 4/00* (2018.01)
(Continued)

(52) U.S. Cl.
CPC .......... *H04W 24/08* (2013.01); *H04B 7/0608* (2013.01); *H04B 7/082* (2013.01);
(Continued)

(58) Field of Classification Search
CPC .... H04B 7/0608; H04B 7/0808; H04B 7/082; H04B 7/10; H04L 69/14; H04W 24/08;
(Continued)

(56) References Cited

U.S. PATENT DOCUMENTS

| | | | |
|---|---|---|---|
| 6,141,329 A | 10/2000 | Turner | |
| 6,982,987 B2 * | 1/2006 | Cain | H04B 7/0491 370/442 |

(Continued)

FOREIGN PATENT DOCUMENTS

| | | |
|---|---|---|
| CN | 1788432 A | 6/2006 |
| WO | WO 2004/088453 A2 | 10/2004 |

OTHER PUBLICATIONS

English translation of the Chinese Office Action and Search Report for Chinese Application No. 201380071407.7, dated Apr. 28, 2017.

*Primary Examiner* — Stephen J Clawson
(74) *Attorney, Agent, or Firm* — Birch, Stewart, Kolasch & Birch, LLP (57) ABSTRACT

A method for communication between a wireless device node in a wireless sensor network (WSN) and control apparatus or control processes of an industrial control system is used to determine a method of radio transmission which provides a greater or a lesser measure of transmission quality between nodes. Thus a transmitter node measures a transmission quality metric of at least one packet received from two or more different switching branches, identifies which of the two or more switching branches has the greater transmission quality metric, distributes data packets with a first priority to the switching branch with the greater transmission quality metric, and transmits data packets with the first priority such as real-time data on the switching branch with the greater transmission quality metric. A wireless node, a sensor network system and a computer program for carrying out the method are described.

13 Claims, 8 Drawing Sheets

(51) Int. Cl.
*H04W 72/08* (2009.01)
*H04W 72/10* (2009.01)
*H04B 7/06* (2006.01)
*H04B 7/08* (2006.01)
*H04B 7/10* (2017.01)
*H04W 40/12* (2009.01)
*H04L 29/06* (2006.01)

(52) U.S. Cl.
CPC ............. *H04B 7/0808* (2013.01); *H04B 7/10* (2013.01); *H04L 69/14* (2013.01); *H04W 4/005* (2013.01); *H04W 40/12* (2013.01); *H04W 72/085* (2013.01); *H04W 72/10* (2013.01)

(58) Field of Classification Search
CPC ... H04W 40/12; H04W 4/005; H04W 72/085; H04W 72/10
USPC ........................................................ 370/252
See application file for complete search history.

(56) References Cited

U.S. PATENT DOCUMENTS

| | | | |
|---|---|---|---|
| 7,142,866 B2 | 11/2006 | Windham et al. | |
| 7,826,432 B2* | 11/2010 | Lee | H04L 45/00 370/338 |
| 7,864,682 B2 | 1/2011 | Appaji et al. | |
| 9,094,868 B2* | 7/2015 | Tellado | H04W 24/08 |
| 9,094,893 B2* | 7/2015 | Liu | H04W 40/12 |
| 2002/0003813 A1* | 1/2002 | Marko | H03M 13/23 370/477 |
| 2003/0185186 A1* | 10/2003 | Tsutsumi | H04L 12/5695 370/338 |
| 2007/0281621 A1 | 12/2007 | Achkar et al. | |
| 2009/0052408 A1* | 2/2009 | Kwak | H04W 74/002 370/336 |
| 2010/0054512 A1* | 3/2010 | Solum | H04R 25/554 381/315 |
| 2011/0280224 A1 | 11/2011 | Falck et al. | |
| 2012/0099587 A1 | 4/2012 | Fan et al. | |

* cited by examiner

Switching between L branches

METHOD FOR PROVIDING RELIABLE WIRELESS COMMUNICATION IN A WIRELESS SENSOR NETWORK

TECHNICAL FIELD

The present invention is concerned with a method for communication between nodes in a wireless sensor network of an industrial control system or a process control system. In particular the invention is concerned with a method for determining a method of wireless transmission which provides a greater or a lesser measure of transmission quality; and a wireless node with hardware and/or software for carrying out the method.

TECHNICAL BACKGROUND

Industrial control systems, process control systems, distributed control systems and the like in process industries often comprise both hard-wired data networks and wireless data networks. Wireless sensor networks are used to communicate measurements and some control data between wireless field devices such as sensors, and/or actuators, and the industrial control system. Wireless sensors are often battery powered.

It is known that the environment in industrial plants and installations is harsh which can make reliable wireless communication a challenge. In this description industrial plants may include oil and gas (petroleum) exploration, production or processing installations in oil and gas production/extraction installations; pulp and paper mills, metal rolling mills, cement works, electrical power generation, transmission and distribution installations, processes or equipment on a ship or on an oil platform, mines both above ground and underground, and so on. In some cases the signal strength in an industrial plant may fluctuate by around 40-50 dB. And in addition, in some cases the signal strength may drop even further due to shadow fading (for instance when a truck is parked in front of the wireless device). Despite the challenges posed by a harsh wireless environment, the use of industrial wireless sensor networks is predicted to increase exponentially within the industrial automation domain and they will be deployed in very harsh industrial environments which will make it difficult to ensure reliable communication.

Such a harsh wireless environment liable to temporary changes in wireless transmission/reception conditions makes radio communication in industrial plants a challenge, especially for real-time communication with strict delay requirements and deterministic behavior. Available Industrial Wireless Sensor Network standards such as IEEE 802.15.4 [1], ISA100 [3], WIA-PA [4] and Industrial WLAN [5] provide guidance for normal transmission and reception. However these standards do not provide information on how to improve the reliability in wireless sensor networks used in industrial installations.

From another technical field, the field of mobile wireless communication networks, a patent U.S. Pat. No. 6,982,987, entitled Wireless communication network including data prioritization and packet reception error determination features and related methods, assigned to Harris Corp., describes a method to prioritize communications in a mobile communication network. It further discloses a mobile ad-hoc network (MANET) wherein data is assigned a priority level with a respective Quality of Service (QoS) requirement. A QoS metric, which is said to be e.g. the signal-to-interference ratio (SIR), is determined for different transmission time slots and is used to map prioritised data to the best time slot. Similarly another patent, U.S. Pat. No. 7,142,866, entitled Load leveling in mobile ad-hoc networks to support end-to-end delay reduction, QoS and energy leveling; and also assigned to Harris Corp., also discloses a mobile ad-hoc network (MANET) where data is prioritised according to type-of-service (ToS) and transmitted on routes that are ranked according to their quality-of-service (QoS). The QoS is said to be based on e.g. link reliability, the meaning of which term is, however, not further explained.

In U.S. Pat. No. 7,864,682, entitled Method for routing data in networks, assigned to Samsung Electronics, a wireless mesh network is disclosed, wherein different types of traffic have different requirements and are therefore routed differently. In this disclosure, the metrics used are link latency or link bandwidth. In another disclosure relying on route identification, US2012099587, entitled "Forwarding and routing in sensor networks" and assigned to Toshiba K.K., a wireless mesh sensor network and a method is disclosed wherein traffic is classified into two different levels of priority (standard or critical). The critical priority data is routed in the most reliable route, which is determined by measuring a signal-to-interference-plus-noise (SINR) value of each route. The disclosure describes that the most reliable route is identifiable by the node on the basis of previous successful transmissions, success being determined on the receipt of an acknowledgement from a packet recipient node.

However although there are some known methods to make a static determination of an identified best route there is room in the field of industrial wireless sensor networks for improvement in the reliability of wireless communication.

SUMMARY OF THE INVENTION

The aim of the present invention is to remedy one or more of the above mentioned problems. This and other aims are obtained by a method characterised by claim 1.

In a first aspect of the invention a method is disclosed for providing reliable wireless communication in a wireless sensor network connected to an industrial control system by determining a method of radio transmission with a greater or a lesser measure of transmission quality, which method comprises measuring at a transmitter node a transmission quality metric of at least one data packet received from two or more different polarised switching branches, identifying which of the two or more polarised switching branches has the greater transmission quality metric, distributing data packets with a first priority to the polarised switching branch with the greater transmission quality metric, and transmitting data packets with the first priority (such as real-time data) on the polarised switching branch with the greater transmission quality metric.

According to an embodiment a method is disclosed for providing reliable wireless communication in a wireless sensor network connected to an industrial control system by determining a method of radio transmission with a greater or a lesser measure of transmission quality, which method comprises measuring at a transmitter node a transmission quality metric of at least one data packet received from two or more different polarised switching branches, which further comprises identifying or retrieving) one or more predetermined routes in said wireless sensor network for data packets addressed to a given node, the predetermined route having a known signal-to-noise quality measure, determining which of the two or more polarised switching branches on a part of the identified predetermined route has the greater transmission quality metric, and transmitting data packets with the first priority over the predetermined route identified with a greater signal to noise quality measure using the polarised switching branch identified with the greater transmission quality metric.

According to another embodiment a method is disclosed for providing reliable wireless communication in a wireless sensor network connected to an industrial control system by determining a method of radio transmission with a greater or a lesser measure of transmission quality, which method comprises measuring at a transmitter node a transmission quality metric of at least one data packet received from two or more different polarised switching branches, which method may further comprise distributing data packets with a second priority to the switching branch with a lesser transmission quality metric, and transmitting the second or lower priority data on the polarised switching branch with the lesser transmission quality metric.

According to an embodiment a method is disclosed for providing reliable wireless communication in a wireless sensor network connected to an industrial control system by determining a method of radio transmission with a greater or a lesser measure of transmission quality, which method comprises measuring at a transmitter node a transmission quality metric of at least one data packet received from two or more different polarised switching branches, which method further comprises transmitting data packets on a polarised switching branch configured as any antenna element from the group of: linearly polarized; horizontally polarized; vertically polarized; circularly polarized.

According to another embodiment a method is disclosed for providing reliable wireless communication in a wireless sensor network connected to an industrial control system by determining a method of radio transmission with a greater or a lesser measure of transmission quality, which method comprises measuring at a transmitter node a transmission quality metric of at least one data packet received from two or more different polarised switching branches, which method further comprises selecting a polarised switching branch by means of selecting one or more polarised switching branch elements from a plurality of polarised switching branch elements.

According to an embodiment a method is disclosed for providing reliable wireless communication in a wireless sensor network connected to an industrial control system by determining a method of radio transmission with a greater or a lesser measure of transmission quality, which method comprises measuring at a transmitter node a transmission quality metric of at least one data packet received from two or more different polarised switching branches, which method further comprises selecting a polarised switching branch by means of adjusting relative transmission signal strength between two or more polarized switching branch elements.

According to an embodiment a method is disclosed for providing reliable wireless communication in a wireless sensor network connected to an industrial control system by determining a method of radio transmission with a greater or a lesser measure of transmission quality, which method comprises measuring at a transmitter node a transmission quality metric of at least one data packet received from two or more different polarised switching branches, which method further comprises transmitting data packets on a switching branch for which the transmission quality metric is any from the group of: Signal to Interference plus Noise SINR; Signal-to-Interference ratio (SIR); packet reception error value (PREV); a transmission quality metric related to number of dropped packets.

According to an embodiment a method is disclosed for providing reliable wireless communication in a wireless sensor network connected to an industrial control system by determining a method of radio transmission with a greater or a lesser measure of transmission quality, which method comprises measuring at a transmitter node a transmission quality metric of at least one data packet received from two or more different polarised switching branches, which method further comprises receiving in a wireless transmitter node or sensor device a data packet and reading at least part of it, retrieving information to identify the data packet as first priority data from any of packet header, sender address, receiver address, database list;

determining if the received data packet has a first priority and, if so distributing it to a switching branch with the greater transmission quality metric and, if not first priority, then distributing it to a polarised switching branch with a lesser transmission quality metric.

The invention discloses a simple but a very effective method to provide reliable communication within industrial wireless sensor networks without violating any current standards based on standards such as IEEE 802.15.4 [1]. The method uses multiple polarization branches in each node, also called polarised switching branches in this description, to distinguish the best link, the link with the best transmission quality metric, on which to transmit real-time communication. The link or links with less quality is/are used for best effort traffic, traffic which does not have the first priority. By means of this method data with the highest priority, such as real-time data, is always transmitted on the best link (the link with best transmission quality metric). A further advantage of this method is that wireless interference in an environment may change, for example, from minute to minute. However the link quality is determined dynamically and measured in real time so that the link with the best quality has the best link quality at the time of transmission in the vast majority of instances.

Sending first priority traffic on one polarised switching branch and second priority traffic on another polarised switching branch also reduces the bandwidth used in an otherwise conventional wireless network. The first priority data traffic requires fewer re-sends and has less dropped packets. Also, wireless transmission over selected polarised switching branches is still compatible with industrial standards such as WirelessHART and will interfere less with other surrounding wireless networks, e.g., WLAN, ZigBee, Bluetooth, etc., and in particular any networks operating in the 2.4 GHz ISM frequency band.

In normal operation the present invention used in a wireless sensor network connected to an industrial control system provides improved communication of high priority data,
improved reliability of the network,
reduced total energy consumption by nodes,
increased network throughput,
reduced end-to-end latency in the network.

There is a continual and generally increasing requirement for information about plant equipment, current and historic process data, trends, etc to carry out supervision and control of control of processes, industrial plants and production facilities. This information is typically provided by the industrial control system and usually in the form of one or more distributed control systems (DCS) and/or supervisory control and data acquisition (SCADA) systems. The control system relies in turn on a stable and timely flow of measurement data from sensors, actuators such as valves etc, temperature measurement, pressure measurements and so on.

Wireless sensor networks may be connected permanently or temporarily to control systems for monitoring and control purposes and are widely used in a number of different industrial environments, such as for instance pulp and paper processes, oil and gas production processes and electrical power production processes.

Wireless sensor networks may be installed or extended temporarily. In this case, wireless sensor devices will typically be battery powered and not require power cabling to be installed. Adding battery powered wireless sensor devices may be done with minimum disruption to existing infrastructure and production. Reduced energy consumption by the wireless sensor devices transmitting according to the methods of the invention means a longer operating lifetime for battery powered nodes.

Additional or replacement retrofit wireless sensor projects in plants that already have traditional hard-wired field devices, sensors, and sensor data networks benefit from the invention. The retrofit of wireless systems is very advantageous because of the minimum disruption to the existing installations as new data cabling does not have to be run. Also, as mentioned, for any battery or self-powered wireless sensor devices power cabling does not need to be run either, thus greatly reducing downtime for installation work and the overall cost of installations.

In a second aspect of the invention a wireless transmitter node, such as a wireless sensor device, is disclosed which is configured for communication in a wireless sensor network connected to an industrial control system, which node or device is arranged with processor hardware and program instructions for determining a method of radio transmission which provides a greater or a lesser measure of transmission quality, and configured to carry out in the processor hardware instructions to cause the wireless transmission node, or wireless sensor device, to carry out the steps of:

measuring at a wireless transmitter node a transmission quality metric of at least one packet received from two or more different polarised switching branches, identifying which of the two or more polarised switching branches has the greater transmission quality metric, distributing data packets with a first priority to the polarised switching branch with the greater transmission quality metric, and transmitting data packets with the first priority (eg real-time data) on the polarised switching branch with the greater transmission quality metric.

According to an embodiment the wireless transmission node, or wireless sensor device, may be a device arranged as any from the group of: wireless field device, wireless sensor, wireless instrument, wireless meter, wireless adapter of one or more field devices, wireless sensor mounted on an actuator, wireless hub, router, access point, wireless gateway.

According to an embodiment the wireless transmission node, or wireless sensor device, may be a device configured as any from the group of: processor, multi-core processor, Field-Programmable Gate Array (FPGA), Complex Programmable Logic Device (CPLD), Application Specific Integrated Circuit (ASIC).

In a third aspect of the invention a wireless sensor network connected to an industrial control system is disclosed which comprises a plurality of wireless transmitter nodes, comprising wireless sensor devices, wherein two or more nodes and/or devices are configured for communication in the wireless sensor network which is connected to an industrial control system, which nodes and/or devices are arranged with processor hardware and program instructions for determining a method of radio transmission which provides a greater or a lesser measure of transmission quality, and configured to carry out in the processor instructions to cause the wireless transmitter nodes and/or wireless sensor devices to carry out the steps of:

measuring at a wireless transmitter node a transmission quality metric of at least one packet received from two or more different polarised switching branches, identifying which of the two or more polarised switching branches has the greater transmission quality metric, distributing data packets with a first priority to the polarised switching branch with the greater transmission quality metric, and transmitting data packets with the first priority on the polarised switching branch with the greater transmission quality metric.

In a fourth aspect of the invention, a computer program, and a computer program recorded on a non-transitory computer-readable medium such as a computer program product are disclosed, for carrying out the above described method for wireless communication between one or more wireless sensor devices and wireless nodes in a wireless sensor network of an industrial control system.

BRIEF DESCRIPTION OF THE DRAWINGS

A more complete understanding of the method and system of the present invention may be had by reference to the following detailed description when taken in conjunction with the accompanying drawings wherein:

FIGS. 8a, 8b shows another diagram for an antenna of the wireless node of the second aspect of the invention of FIG.

1 and in particular shows schematically polarized elements or polarised switching branches of the antenna with different polarization characteristics;

DESCRIPTION OF THE PREFERRED EMBODIMENTS

The present invention will now be described more fully hereinafter with reference to the accompanying drawings, in which certain embodiments of the invention are shown. Like numbers refer to like elements throughout the description.

Figure 7:
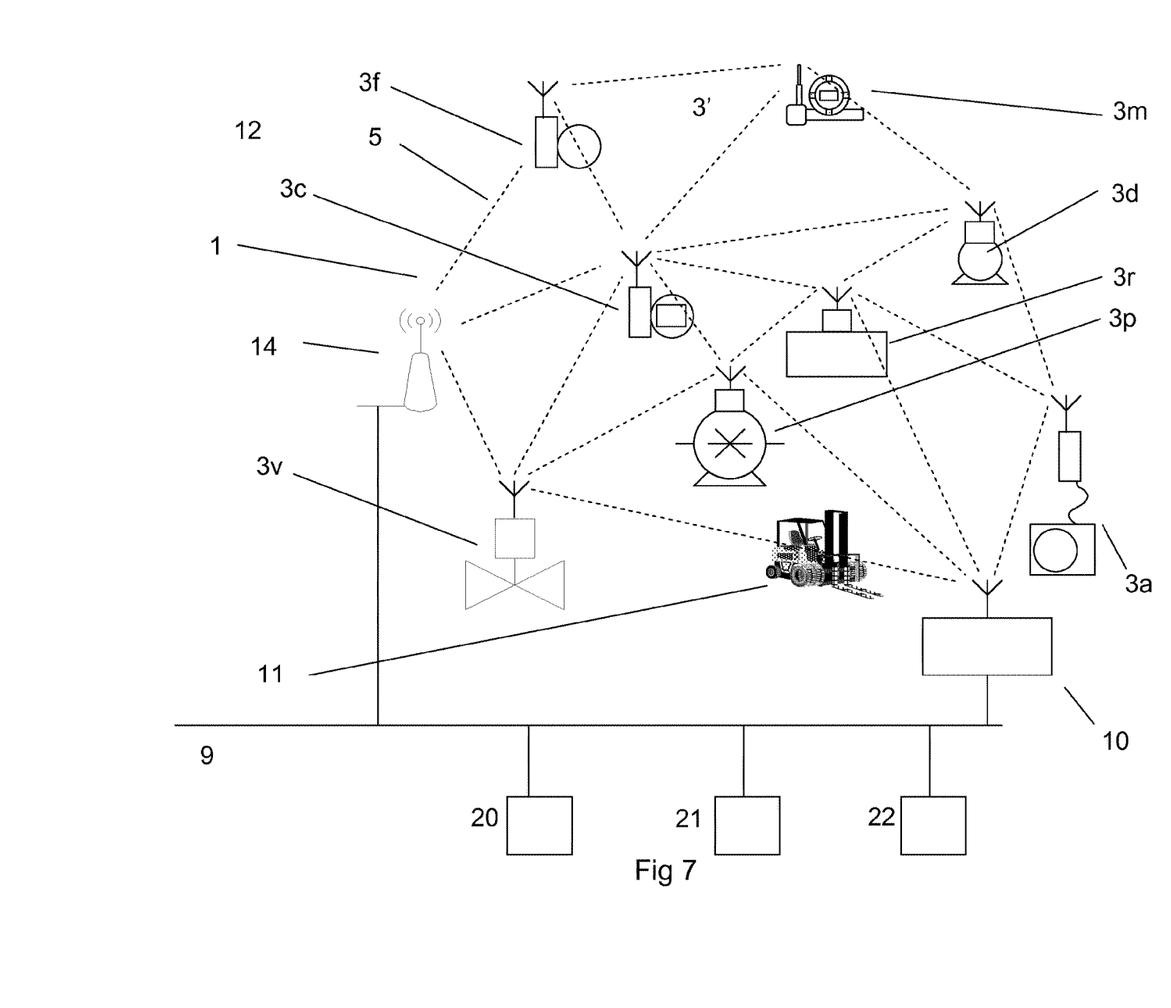
FIG. 7 shows a schematic view of a wireless sensor network (WSN) connected to an industrial control system including one or more wireless nodes according to a second aspect of the invention with which the invention of FIG. 1 may be advantageously practiced.

FIG. 7 shows a wireless sensor network 1 (WSN) connected to a part of an industrial control system 12. The industrial control system may be a process control system, distributed control system or similar. FIG. 7 shows a data bus 9 of the industrial control system 12 to which process interface units 20, 21, 22 are connected. The process interface units 20, 21, and 22 are for providing control of one or more processes and for receiving measurement data from the one or more processes.

The figure also shows a plurality of wireless sensors 3a-p in a wireless sensor network 5. The wireless network also has a wireless router 3r and may be arranged as a wireless mesh network. The industrial control system 12 is arranged with a wireless access point 14 and a wireless gateway 10. Wireless device 3v represents wireless sensor mounted on a motorised valve, a type of actuator, and wireless sensor 3p is mounted on another type of actuator, a pump. Other wireless sensor devices shown are wireless meter 3c, 3f, wireless flowmeter 3m, measuring instrument with a wireless adapter 3a, wireless vibration sensor 3d mounted on a motor.

Some wireless sensors are part of a control loop that is controlled by the industrial control system wherein data from the wireless sensor is required in real time, or almost real-time, in order for the control loop to function as designed.

For example wireless sensor devices or nodes that are mounted on an actuator such as the pump 3p or the valve 3v may be part of a real-time or near real-time control loop or feedback loop. Data from such wireless sensor devices are examples of data packets that may be configured be sent with a first priority. Sensors returning measurement signals that are updated, say, once per 2 minutes, may be prioritised as second priority data packets, and sent via best effort or good enough transmission paths.

The wireless sensor network may operate as a mesh network. For example wireless sensor 3m mounted on a flowmeter may transmit data packets to the wireless gateway 10 or wireless access point 14 to reach an address in the industrial control system using any of a plurality of routes. Wireless sensor 3m may, for example, transmit i) directly to wireless gateway 10;
ii) transmitted via one other node, eg router 3r;
iii) transmitted via three nodes 3c, 3p, and router 3r to the gateway 10;
iv) alternatively transmitted via two other nodes vibration sensor 3d and instrument 3a to wireless gateway 10.

Each transmission path on each part, or link, of a transmission route may have different signal transmission characteristics. There are several metrics related to signal transmission quality that may be used to measure signal transmission quality or effectiveness. These include: Signal to Interference plus Noise SINR; Signal-to-Interference ratio (SIR); packet reception error value (PREY); or a transmission quality metric related to number of dropped packets. A combination of quality metrics may also be used to measure quality of a transmission link. Measured transmission signal quality is used to provide information on which channel or polarised switching branch the high priority data packets, in this industrial context that means primarily real-time traffic, should be transmitted; and to identify on what other channel or channels the less time-sensitive data packets, what may be called best effort traffic, should be sent.

Transmission quality of a data link such as 3m to 3d, or of 3m to 3r is measured using at least two different polarised switching branches. A switching branch in this specification is an arrangement of elements of an antenna for transmitting a polarized wireless signal.

Figure 6:
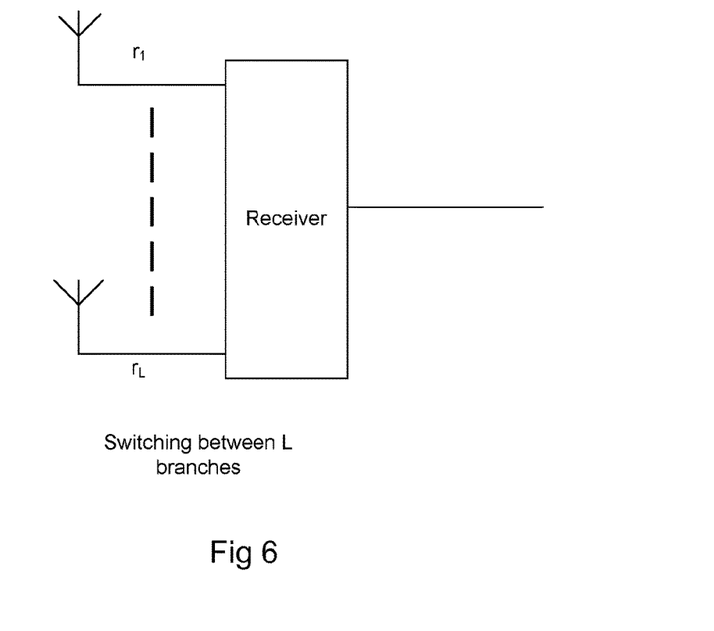
FIG. 6 shows a schematic diagram for an antenna of the wireless node of the second aspect of the invention of FIG. 1 and in particular of polarized elements or polarised switching branches of the antenna.

FIG. 6 shows schematically an antenna of the wireless sensor device node of the second aspect of the invention. The antenna has a plurality of elements or switching branches rl to rL which receive or send signals with different polarization characteristics and thus with different degrees of transmission quality. Measurements are taken using one or more signal transmission quality metrics of a received signal for each switching branch, eg rl-L1, and/or 44-47. The switching branches or elements that give the best signal quality, because that they have a polarization characteristic that is most effective in the wireless reception environment, are used for first priority data. Second priority data is sent using one of the remaining switching branches.

Figure 8A:
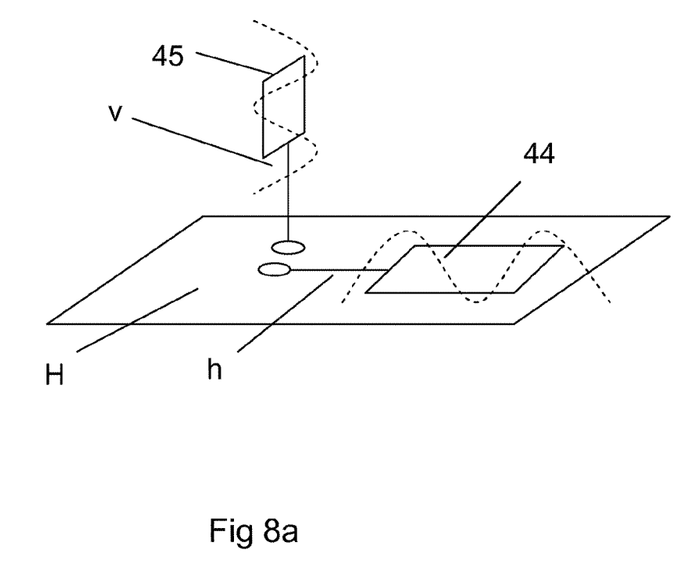
Figure 8B:
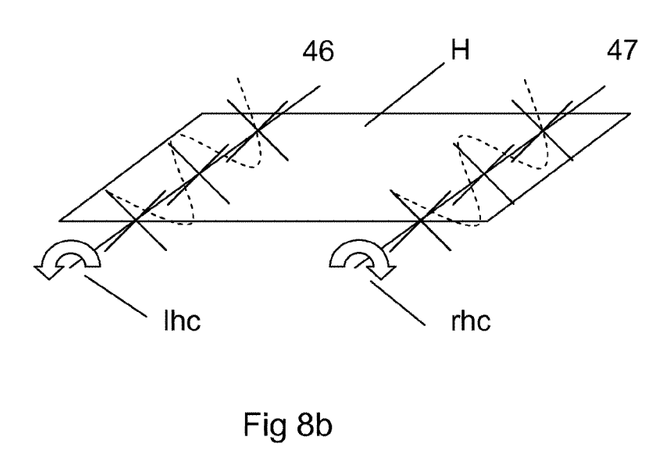

Switching branches or different designs of antenna may be optimised for a particular type of polarization. Some known polarisation types are summarised in FIG. 8a, 8b. FIG. 8a shows schematically a vertical linearly polarised signal v radiating in the vertical direction from a vertical switching branch 45 arranged orthogonally to a horizontal plane H. The figure also shows a horizontal linearly polarized signal h propagating from a horizontal switching branch 44 arranged orthogonally to the vertical linear polarised signal v. The vertical switching branch 45 may be an element of a simple or a compound antenna. Similarly horizontal switching branch 44 may be one element of a simple or compound antenna. Another type of polarisation, circular polarisation, is shown schematically in FIG. 8b. The figure shows a left hand circular polarised signal lh c and may be produced by a circular polarized switching branch or multi element antenna of the YAGI type schematically shown as a lh (left hand or counter clockwise rotation) circular antenna 46 and as a rh circular antenna 47 (right hand or clockwise rotation. A wireless signal is propagated as a clockwise or anticlockwise rotating wave along the direction of the long axis of the switching branch 46, 47. A variant of circular polarised transmission is ellipsoidal transmission.

Figure 1:
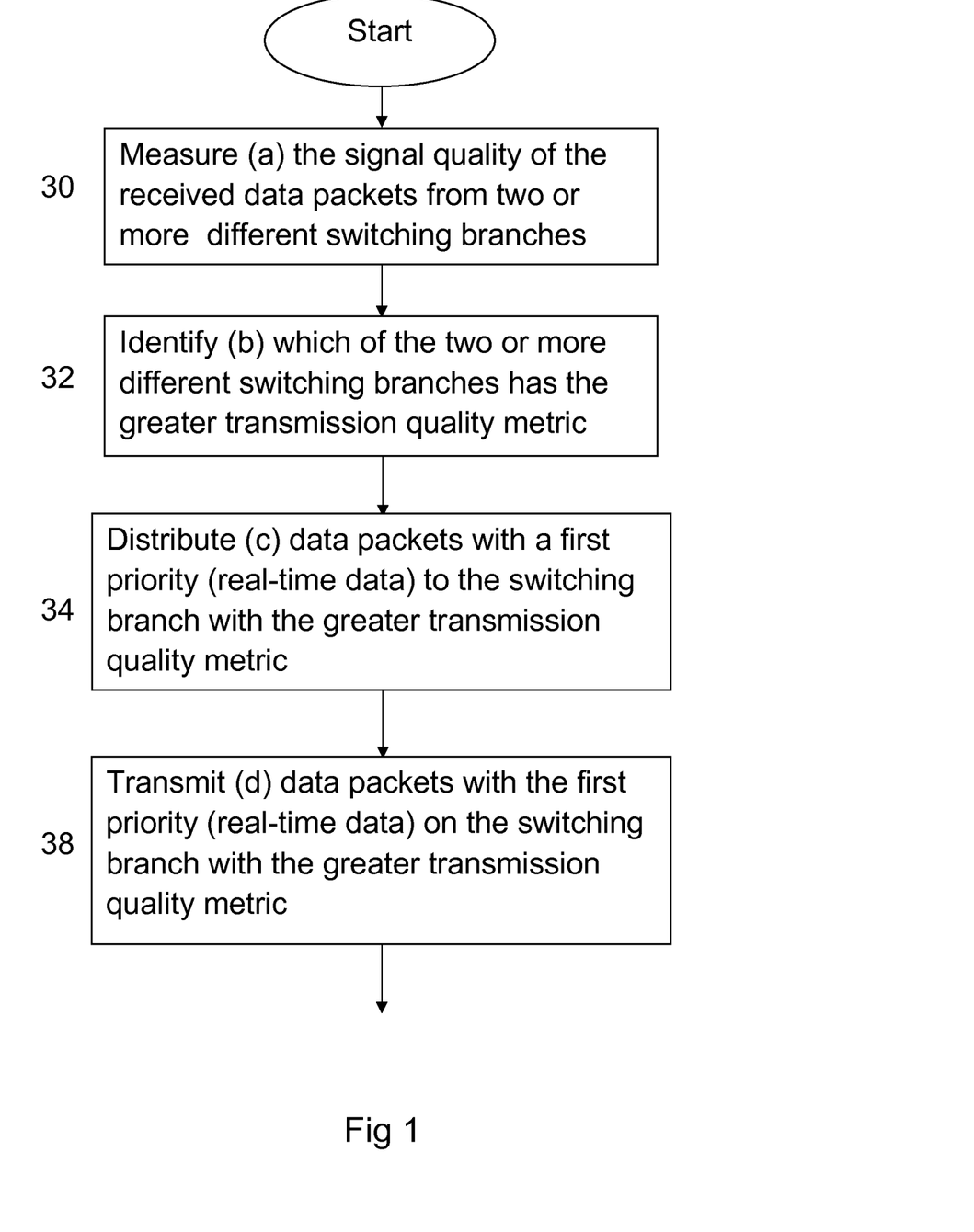
FIG. 1 shows a schematic flowchart for a method according to a first aspect of the invention for providing more reliable wireless communication in a wireless sensor network and in particular improved reliability for a first or high priority type of data.

The method for providing the most reliable communication path is summarised according to a preferred embodiment by the flow chart of FIG. 1. FIG. 1 shows the steps of:

30 Measure (a) the signal quality of the received data packets from two or more different polarised switching branches (rl-rL; 44-47), 32 Identify (b) which of the two or more different polarised switching branches has the greater transmission quality metric, 34 Distribute (c) data packets with a first priority (eg real-time data) to the polarised switching branch with the greater transmission quality metric, 38 Transmit (d) data packets with the first priority (eg real-time data) on the polarised switching branch with the greater transmission quality metric.

Thus two or more polarised switching branches are investigated to find the which form of polarised wireless transmission provides the best transmission quality over a given link, at a given time, the time when the measurement is made. First priority traffic is then transmitted over the polarised switching branch and link with the best measure of transmission quality. Second priority traffic is sent over a link measured to have a lesser quality of transmission.

Figure 3:
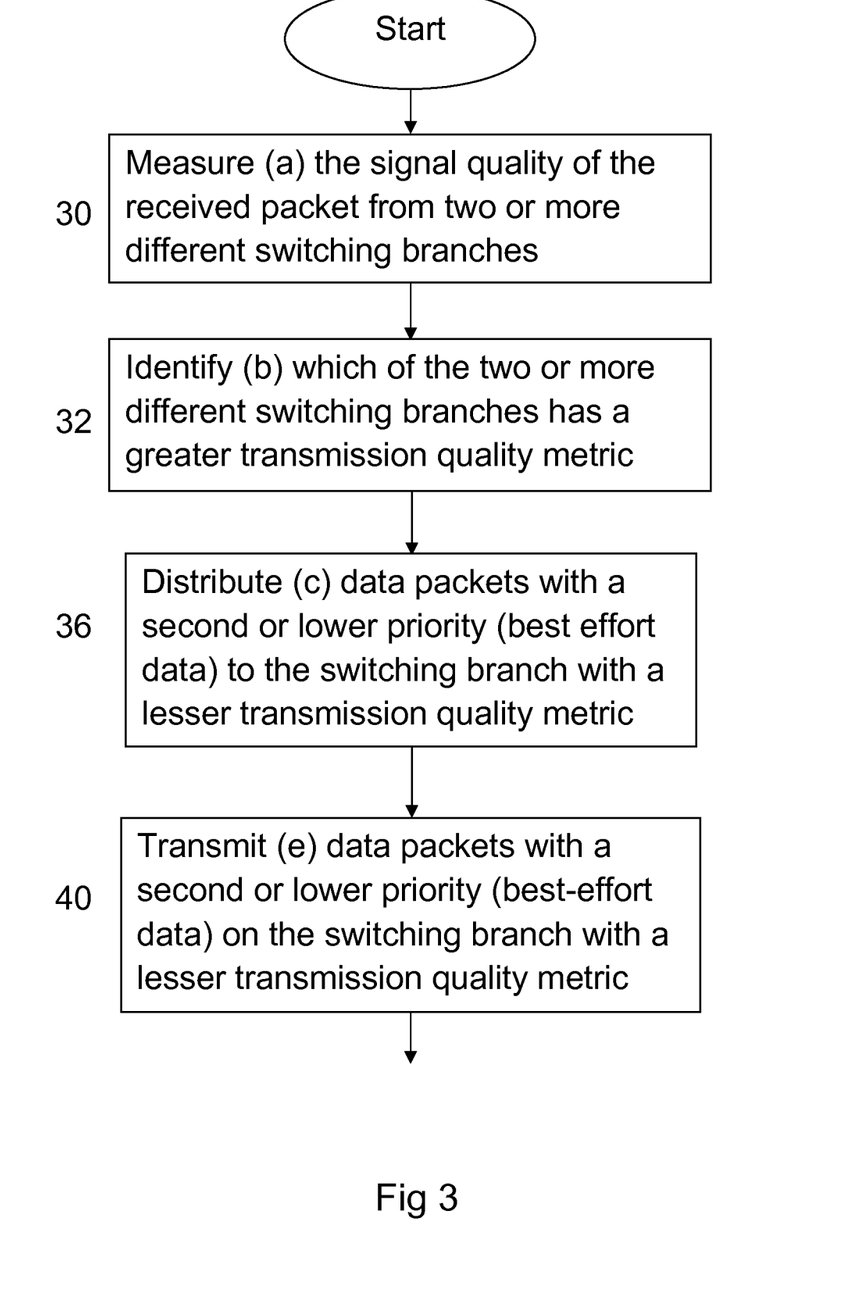
FIG. 3 is a schematic flowchart for a method according to the invention of FIG. 1 and is more particularly an embodiment for handling communications with a second or lower priority according to a preferred embodiment.

The method of providing the most reliable communication path and identifying transmission paths is summarised according to another embodiment for sending lower priority data, data with a second priority, in the flow chart of FIG. 3. FIG. 3 shows the steps of:

30 Measure (a) the signal quality of the received data packets from two or more different polarised switching branches (rl-rL; 44-47), 32 Identify (b) which of the two or more different polarised switching branches has the greater transmission quality metric, 36 Distribute (c) data packets with a second or lower priority (best effort data) to the polarised switching branch with a lesser transmission quality metric, 40 Transmit (e) data packets with a second or lower priority (best-effort data) on the polarised switching branch with a lesser transmission quality metric.

In this way communication traffic identified as lower priority data is transmitted using polarised switching branches with a lower transmission quality, which advantageously reduces the amount of data traffic that has to be handled by wireless nodes handling first priority traffic.

Wireless interference in an environment may, for example, change from minute to minute. An example of this is suggested in FIG. 7 by a vehicle such as fork lift truck 11 which may travel through an industrial process installation such as a rolling mill, a cement factory, an oil refinery or a paper mill. The fork lift truck 11 or another utility vehicle or repair vehicle may also park in front of a wireless node for a few seconds, or for several hours. However, as the link quality is determined dynamically and measured in real time, the switching branch with the best transmission quality has also the best transmission quality at the time of transmission in the vast majority of instances.

Figure 5A:
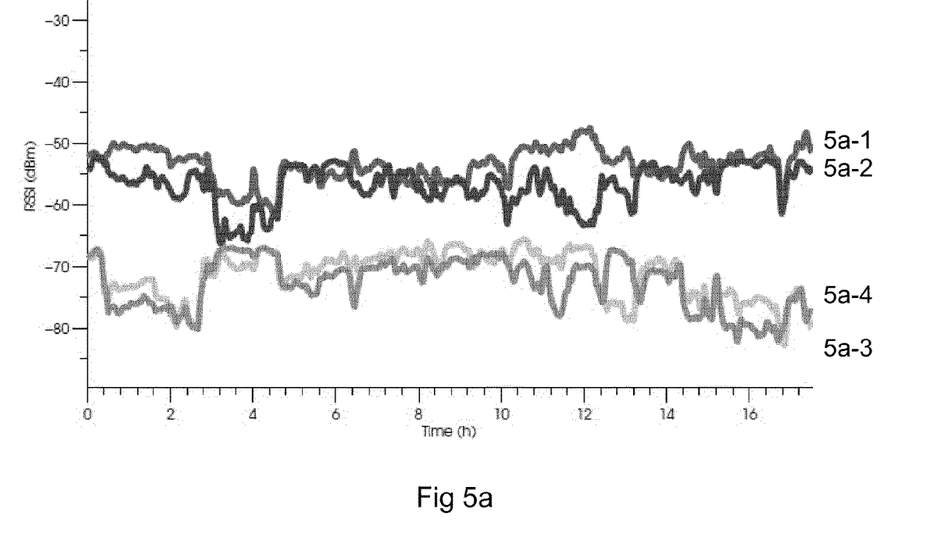
FIGS. 5a, 5b and 5c show three examples of a measured transmission signal quality metric in industrial process plant settings which measurements are relevant for using the invention of FIG. 1.

FIG. 5*a*: shows continuous RF (Radio Frequency) measurements plotted as RSSI (Received Signal Strength Index, dBm (decibels per milli-watt) over a period of hours in an industrial plant. The diagram shows that the first priority (real-time) traffic should be sent on the switching branch or channel plotted as the two closely plotted upper curves 5*a*-1, 5*a*-3 during most of the day and the second priority (best effort) traffic should be sent on the switching branch or channel plotted as the two closely plotted lower curves 5*a*-2, 5*a*-4.

Figure 5B:
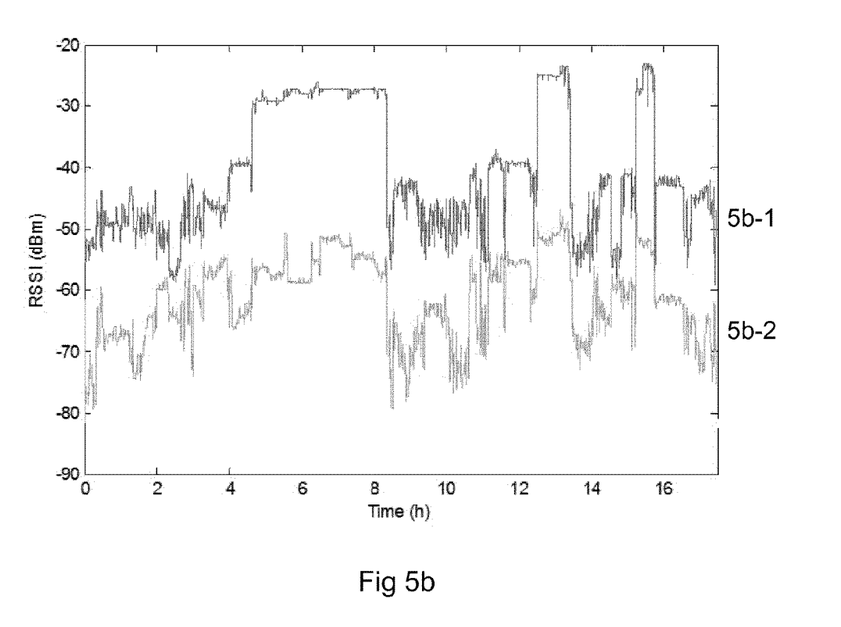

FIG. 5*b*: shows continuous RF measurement at a paper mill showing that with sophisticated "weighting" there is about a 20 dB gain in the signal transmission quality metric by using a particular polarised switching branch. In this diagram and example the first priority (real-time) traffic should be sent on the switching branch or channel plotted as the upper curve 5*b*-1 and the second priority (best effort) traffic should be sent on the switching branch or channel plotted as the lower curve 5*b*-2.

Figure 5C:
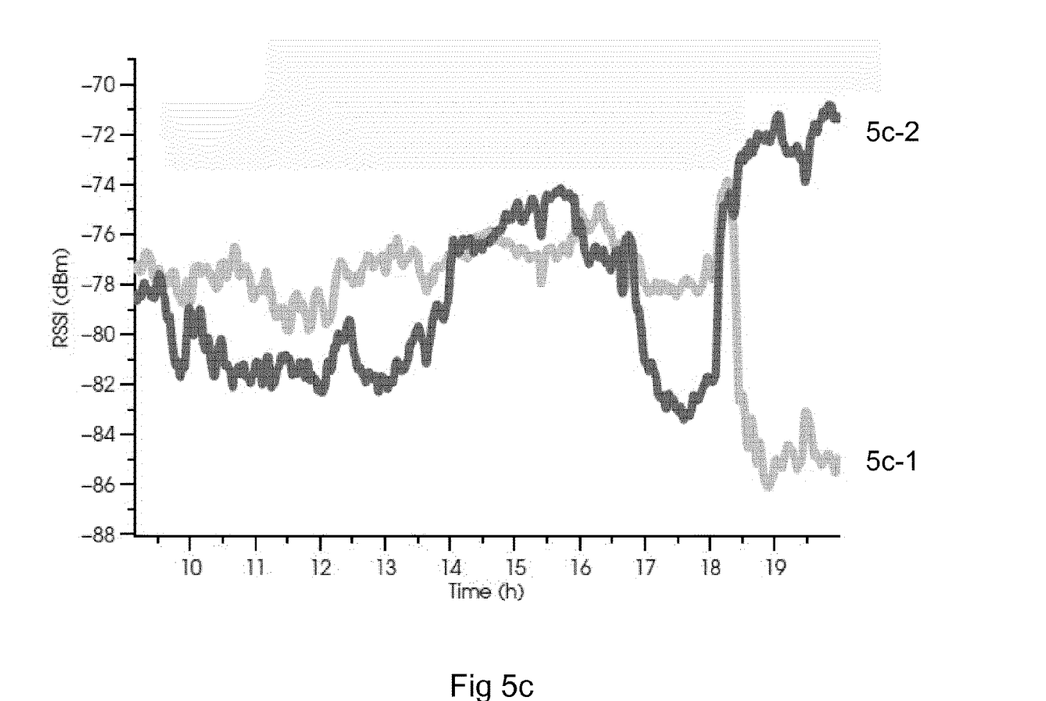

FIG. 5*c*: shows continuous RF measurement on a communication link in an industrial installation and that the transmission quality metric as measured by RSSI changed abruptly around 14.00 hours. The first priority (real-time) traffic should have been sent on the polarised switching branch or channel plotted as the upper curve 5*c*-1 until 14.00. Then between 14.30 and 16.00 first priority data packets should have been sent on the switching branch that was plotted as the lower curve 5*c*-2 until about 16.00, and again between about 18.30 and 19.00+. After 18.30 the transmission quality metric for the polarised switching branch plotted as the upper curve 5*c*-2 before 14.00 gains 10 dB or more over the other switching branch in measured as RSSI. In the wireless environment where these measurements were made it is clear that measuring the switching branch with the best signal transmission quality, and so identifying the switching branch with the most effective polarisation characteristic, and transmitting using that switching branch, provides more reliable wireless communication.

Each of FIGS. 5*a*-5*c* also demonstrate that wireless interference in an environment may change, for example, from minute to minute. Because the link quality is measured dynamically according to the invention the method can thus handle changing or fluctuating wireless communication conditions in the industrial environment.

Data packets with a first priority, such as real time data, data concerning certain safety conditions, data concerning Emergency Stop or otherwise given first priority preferably may include a marker of some sort in a data packet. This marker to indicate priority may be a control bit in a packet header, for example, or in another part of the data packet that is always read by a receiving node.

First priority data packets may also be identified as a data packet from a specific wireless sensor node which may be identified in a wireless address schema, list or database accessible to all the wireless sensor devices. Similarly, first priority data packets may be identified as a data packet addressed to a specific address, an address in a wireless address schema, list or database accessible to all the wireless sensor devices, or data or an indicator included with the payload data. A combination of information written in a data packet and a specific sender and/or receiver address may also be used.

Figure 4:
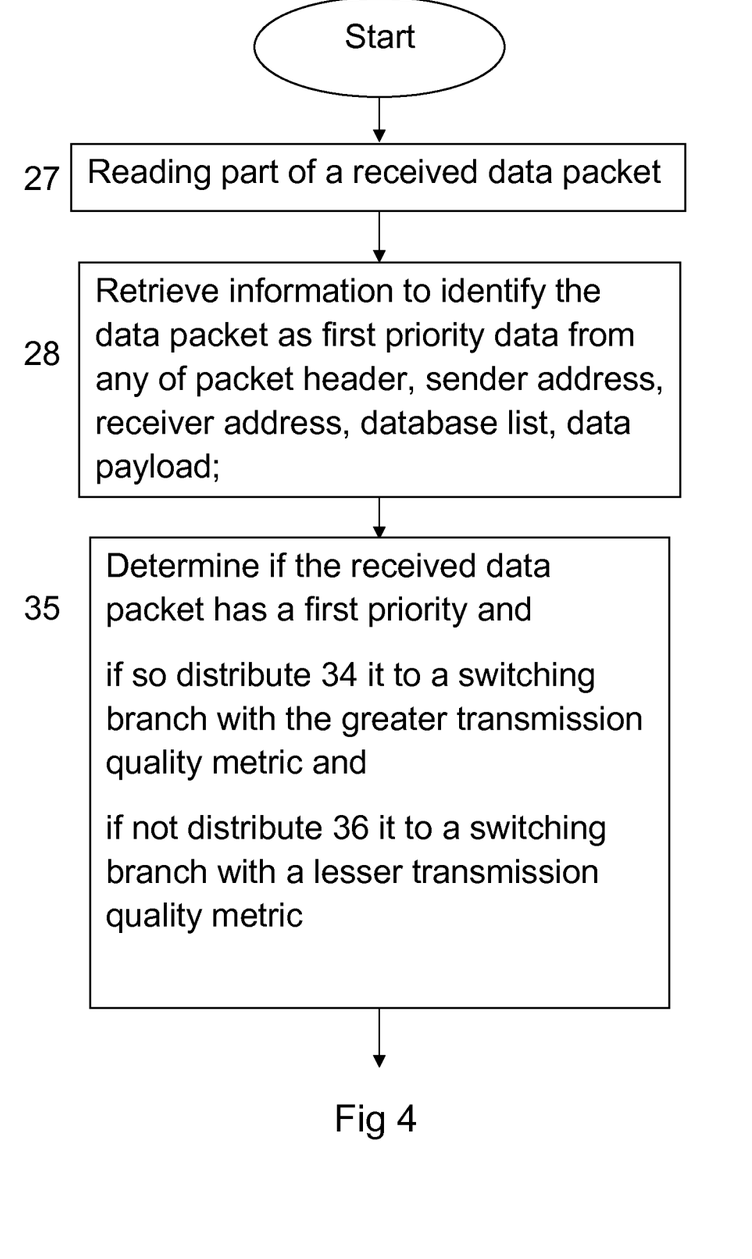
FIG. 4 is a schematic flowchart for a method according to FIG. 1 and in particular for determining the first or second transmission priority for a data packet.

This is summarised in the flowchart of FIG. 4. FIG. 4 shows the steps of:

27 Receiving a data packet and reading at least part of it,

28 Retrieving information to identify the data packet as first priority data from any of packet header, data payload, sender address, receiver address, database list;

35 Determining if the received data packet has a first priority and, if so distributing 34 it to a switching branch with the greater transmission quality metric and, if not first priority then distributing it 36 to a switching branch with a lesser transmission quality metric.

Although priority of data has been described in terms of a first priority and a second priority this does not preclude the use of one or more additional priorities in certain situations. For example additional priorities may be used: during a production start-up phase; in a time period around the time of changes of shift; during a day or night shift; within a plant area during a time when there is an active gas or explosion alarm in the plant area; during a time of exceptional weather activity such as a severe thunderstorm.

Each node in the Wireless Sensor Network, such as wireless devices 3*a*-3*p*, wireless router 3*r*, wireless access point 14 or wireless gateway 10 (FIG. 7) has an address within the wireless network. Each node can send data packets containing measurements, status data, control information and so on to a specific monitoring or control unit in the host system, where host system in this case means the industrial control system, ICS, 12. The wireless sensor network WSN may also be connected to a node or access point or gateway of a wireless LAN, and/or may be another kind of wireless node, running any radio protocol suitable for an industrial milieu, such as any standard issued by the Bluetooth Special Interest Group (SIG), any variation of IEEE-802.11, WiFi, Ultra Wide Band (UWB), ZigBee or IEEE-802.15.4, IEEE-802.13 or equivalent, or similar. A radio technology working in the ISM band such as in a protocol from ABB called Wireless interface for sensors and actuators (Wisa) may be used.

Figure 2:
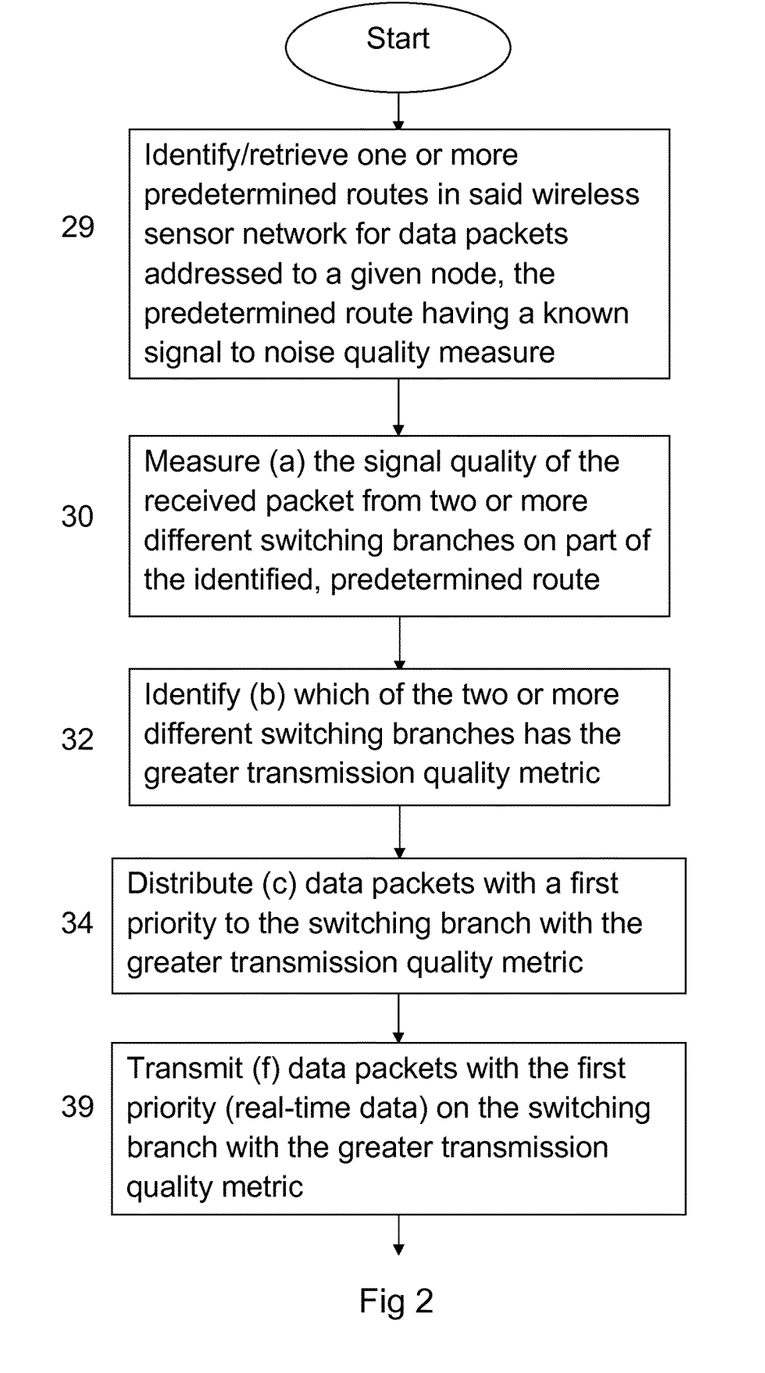
FIG. 2 is a schematic flowchart for a method according to the invention of FIG. 1 and is more particularly an embodiment including an additional step involving using a predetermined best route.

In another embodiment of the invention the method may be modified to use a wireless transmission path between a given pair of nodes which is selected based on predetermined historical information of routes with a better or best transmission quality metric. This is summarized in the flowchart of FIG. 2. FIG. 2 shows the steps of:

29 Identify/retrieve one or more predetermined routes in said wireless sensor network for data packets addressed to a given node, the predetermined route having a known signal to noise quality measure, 30 Measure (a) the signal quality of the received packet from two or more different switching branches on a part of the identified, predetermined route, 32 Identify (b) which of the two or more different polarised switching branches has the greater transmission quality metric, 34 Distribute (c) data packets with a first priority to the switching branch with the greater transmission quality metric, 39 Transmit (d) data packets with the first priority (real-time data) on the switching branch with the greater transmission quality metric over part of the identified, predetermined route.

Thus wireless links between pairs of wireless field devices, wireless sensors 3a-p or wireless transmission nodes 3r, 10, 14 may be selected 29 based partly on a previously determined best route, predetermined on the basis of historic measurements. This identified route may be selected and then measured 30 using one or more polarised switching branches to identify 32 which switching branch on the selected wireless link between two wireless sensors or nodes has the best transmission quality metric. First priority traffic is then sent 39 on the switching branch with the best transmission quality metric (and over part of the identified, predetermined route) as before described in relation to FIG. 1 and FIG. 2.

The methods of providing reliable wireless communication in wireless sensor networks using measure transmission quality on one or more switching branches as described above, in the FIGS. 1-4 and elsewhere in this specification may be carried out by a computer application comprising computer program instructions or computer program elements or software code which, when loaded in a processor or computer, causes the computer or processor to carry out the method steps. The functions of processing data packets, measuring a transmission quality metric, distributing data packets to a first switching branch or a second switching branch depending on a priority for the data packets, and transmitting data packets on the first or second priority links may be carried out by processing digital functions, algorithms and/or computer programs and/or by analogue components or analogue circuits or by a combination of both digital and analogue functions. The functions may be carried out standard processors or micro processors or multi-core processors or by hardware or configurable hardware such as a Field-Programmable Gate Array (FPGA), Complex Programmable Logic Device (CPLD) or an Application Specific Integrated Circuit (ASIC).

An antenna used in the wireless sensor device may comprise one or more metal elements or wires. An antenna used in the wireless sensor devices may be constructed from components on a circuit board PCB (printed circuit board), or a similar or equivalent substrate. The antenna may comprise one or more physical polarised switching branches or antenna elements. The antenna may also comprise electrical circuit components for filtering and adjusting a wireless signal by, for example, adjusting relative transmission signal strength between two or more components or polarized switching branch elements to form and transmit a wireless transmission signal with a desired polarisation characteristic.

The methods of the invention may, as previously described, be carried out by means of one or more computer programs comprising computer program code or software portions running on a computer or a processor and stored at least in part in memory and as such accessible by the one or more processors in a wireless field devices or wireless sensor devices 3a-3p or wireless transmission node such as nodes 10, 14 and 3r. The or each processor may have a memory storage unit, or may be connected to a memory storage unit of another unit such as a process system control unit or a PLC (Programmable Logic Controller) or other system part thereof. The computer program comprises computer program code elements, instructions or software code portions that make the computer perform the method of data packet aggregation using algorithms and/or equations, data, stored values, predetermined values and calculations previously described. A part of the program may be stored in a processor as above, but also in a ROM, RAM, PROM, EPROM or EEPROM chip or similar memory means.

Figure 9:
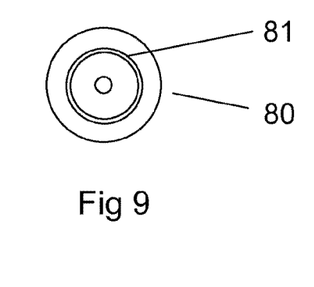
FIG. 9 shows a computer readable medium with a computer program or computer instructions for carrying out the method according to the invention of FIG. 1.

One such data carrier 80 in the form of a CD ROM disk with a computer program 81 carrying such computer program instructions or code is schematically shown in FIG. 9.

The program in part or in whole may also be stored on, or in, other suitable computer readable medium such as a magnetic disk, or a non-transitory computer readable medium such as a CD (compact disc) or a DVD (digital versatile disc), stored on a hard disk, magneto-optical memory storage means, in volatile memory, in flash memory, as firmware, stored on a data server or on one or more arrays of data servers. Other known and suitable media, including removable memory media such as a USB memory stick and other removable flash memories, hard drives etc. may also be used.

REFERENCES

[1] IEEE 802.15.4. http://www.ieee802.org/15/pub/TG4.html.
[2] HART Communication Foundation HCF, Network Management Specification, HCF_SPEC-085, Revision 1.0, 27 Aug. 2007 (Section 9.4)
[3] ISA100 Standard, http://www.isa.org/
[4] Chinese Industrial Wireless Alliance. http://www.industrialwireless.cn/en/06.asp.
[5] IEEE 802.11n-2009-Amendment 5: Enhancements for Higher Throughput
[6] K. Yu, F. Barac, M. Gidlund, J. Akerberg, and M. Björkman, "A flexible error correction scheme for IEEE 802.15.4 based industrial wireless sensornetworks" in Proc. 21$^{st}$ IEEE International Symposium on Industrial Electronics (ISIS '12), China, May 2012.

It should be noted that while the above describes exemplifying embodiments of the invention, there are several variations and modifications to the methods of measuring a transmission quality metric here described, and in particular to methods for selecting a polarised switching branch to use for wireless communication, which may be made according to the disclosed solution without departing from the scope of the present invention as defined in the appended claims.

The invention claimed is:

1. A method for providing reliable wireless communication in a wireless sensor network (WSN) connected to an industrial control system by determining a method of radio transmission with a greater or a lesser measure of transmission quality, said method comprising the steps of:
    measuring at a wireless transmitter node a transmission quality metric of at least one data packet received from two or more different polarised switching branches with different polarization characteristics;
    identifying which of the two or more polarised switching branches has a greater transmission quality metric;
    distributing data packets with a first priority to the polarised switching branch with the greater transmission quality metric and distributing data packets with a second priority to the polarised switching branch with a lesser transmission quality metric;
    transmitting data packets with the first priority on the polarised switching branch with the greater transmission quality metric;
    transmitting the second or lower priority data on the polarised switching branch with the lesser transmission quality metric;
    identifying or retrieving one or more predetermined routes in said wireless sensor network for data packets addressed to a given wireless transmission node, the predetermined route having a known signal-to-noise quality measure;
    determining which of the two or more polarised switching branches on part of the identified predetermined route has the greater transmission quality metric; and
    transmitting data packets with the first priority over the predetermined route identified with a greater signal to noise quality measure using the polarised switching branch identified with the greater transmission quality metric.

2. The method according to claim 1, wherein said two or more different polarised switching branches with different polarization characteristics are configured as any antenna element from the group of: linearly polarized; horizontally polarized; vertically polarized; and circularly polarized.

3. The method according to claim 2, further comprising the step of selecting a polarised switching branch by selecting one or more polarised switching branch elements from a plurality of polarised switching branch elements.

4. The method according to claim 1, wherein the transmission quality metric is measured according to any from the group of: Signal to Interference plus Noise (SINR); Signal-to-Interference ratio (SIR); packet reception error value (PREV); and a transmission quality metric related to number of dropped packets.

5. The method according to claim 1, further comprising the steps of:
    receiving in a wireless transmitter node or sensor device a data packet and reading at least part of the data packet;
    retrieving information to identify the data packet as first priority data from any of packet header, sender address, receiver address, database list, data payload; and
    determining if the received data packet has a first priority and, if so distributing the data packet to a switching branch with the greater transmission quality metric and, if not first priority, then distributing the data packet to a polarised switching branch with a lesser transmission quality metric.

6. The method according to claim 1, wherein the step of transmitting data packets with the first priority on the polarised switching branch with the greater transmission quality metric comprises transmitting real-time data on the polarised switching branch with the greater transmission quality metric using a protocol compatible with any industrial wireless standard from the group of: IEEE 802.15.4, WirelessHART, ISA100.11a, WIA-PA, Bluetooth Special Interest Group (SIG), IEEE-802.11, WiFi, Ultra Wide Band (UWB), ZigBee or IEEE-802.13.

7. A wireless transmitter node configured for communication in a wireless sensor network (WSN) connected to an industrial control system, which node is arranged with processor hardware and program instructions stored in a memory for determining a method of radio transmission which provides a greater or a lesser measure of transmission quality, and for executing, by the processor hardware, the program instructions stored in the memory to cause the wireless transmitter node to:
    measure at a transmitter node a transmission quality metric of at least one packet received from two or more different polarised switching branches with different polarization characteristics;
    identify which of the two or more switching branches has a greater transmission quality metric;
    distribute data packets with a first priority to the polarised switching branch with the greater transmission quality metric and distribute data packets with a second priority to the polarised switching branch with a lesser transmission quality metric;
    transmit data packets with the first priority on the polarised switching branch with the greater transmission quality metric;
    transmit data packets with the second priority on the polarised switching branch with the lesser transmission quality metric;
    identify or retrieve one or more predetermined routes in said wireless sensor network for data packets addressed to a given node, the predetermined route having a known signal-to-noise quality measure;
    determine which of the two or more polarised switching branches has the greater transmission quality metric over the identified predetermined route; and
    transmit data packets with the first priority over the predetermined route identified with a greater signal-to-noise quality measure using the polarised switching branch identified with the greater transmission quality metric.

8. The wireless transmitter node according to claim 7, wherein said two or more different polarised switching branches with different polarization characteristics are configured as any element from the group of: linearly polarized; horizontally polarized; vertically polarized; circularly polarized.

9. The wireless transmitter node according to claim 7, wherein the processor hardware executes the program instructions in the memory to:
    receive a data packet and reading at least a part of the data packet;
    retrieve information to identify the data packet as first priority data from any of packet header, sender address, receiver address, database list, data payload; and
    determine if the received data packet has a first priority and, if so distributing the data packet to a switching branch with the greater transmission quality metric and, if not first priority, then distributing the data packet to a polarised switching branch with a lesser transmission quality metric.

10. The wireless transmitter node according to claim 7, wherein the transmission quality metric is measured according to any from the group of: Signal to Interference plus Noise SINR; Signal-to-Interference ratio (SIR); packet reception error value (PREV); and a quality metric related to number of dropped packets.

11. The wireless transmitter node according to claim 7, wherein the wireless transmitter node is configured to be compatible with any from the group of: IEEE 802.15.4, WirelessHART, ISA100.11a, WIA-PA, Bluetooth Special Interest Group (SIG), IEEE-802.11, WiFi, Ultra Wide Band (UWB), and ZigBee or IEEE-802.13.

12. The wireless transmitter node according to claim 7, wherein the processor hardware comprises any device from the group of: processor, multi-core processor, Field-Programmable Gate Array (FPGA), Complex Programmable Logic Device (CPLD), and Application Specific Integrated Circuit (ASIC).

13. A computer program embodied on a non-transitory computer readable medium and comprising software code portions or computer code to cause a computer or processor to carry out the steps of the method according claim 1.

* * * * *